Oct. 24, 1967     J. A. FOERSTER     3,348,302

METHOD OF MAKING AN ENCAPSULATED COIL BOBBIN

Filed March 21, 1966

INVENTOR.
JAMES A. FOERSTER

BY

*Woodard, Weikart, Emhardt & Naughton*
                       *Attorneys*

United States Patent Office 3,348,302
Patented Oct. 24, 1967

3,348,302
METHOD OF MAKING AN ENCAPSULATED
COIL BOBBIN
James A. Foerster, Fort Wayne, Ind., assignor to Wabash
Magnetics, Inc., Wabash, Ind., a corporation of Indiana
Filed Mar. 21, 1966, Ser. No. 535,982
1 Claim. (Cl. 29—605)

This application is a continuation-in-part of application Ser. No. 250,387, now abandoned, filed Jan. 9, 1963.

The present invention relates to an improved encapsulated coil and to an improved subcombination bobbin thereof and to a method of making the coil and bobbin.

Various types of encapsulated coils and bobbins are available for use in certain high temperature applications. NEMA requirements for electrical coils are that the coil be able to withstand an electrical stress between the winding and ground of twice rated voltage plus 1,000 volts. Fiberglass has been tried as the material making up the bobbin for a class H coil but has been found to be relatively expensive and to possess certain other properties which are not wholly advantageous in this application. For example, fiberglass is generally porous even when impregnated with conventional impregnating material such as varnish or the like.

Consequently, one object of the present invention is to provide an improved encapsulated coil and bobbin therefor and to provide a method of making the same.

Further objects are to provide an encapsulated coil in which the bobbin is firmly bonded to the encapsulation, to provide an encapsulated coil capable of resisting thermal shock conditions, to provide an encapsulated coil incorporating a bobbin which does not break away from the encapsulation material as a result of temperature change, to provide a method of making encapsulated coils and bobbins wherein the materials used are easily worked, and to provide an encapsulated coil in which the bobbin is relatively inexpensive, yet is capable of meeting rigorous use requirements.

Still another object of the invention is to provide an improved bobbin capable of meeting class H or higher thermal requirements whether encapsulated or unencapsulated and of also maintaining mechanical and electrical strength for a period of 10,000 hours or more.

Related objects and advantages will become apparent as the description proceeds.

One embodiment of the encapsulated coil of the present invention comprises a cylindrical tube formed of an aromatic polyamide having the necessary temperature resistance and dielectric properties. An aromatic polyamide with these properties is available from Du Pont, and is sold under the trademark Nomex.

This material is a non-porous aromatic polyamide with physical and electrical properties that make it ideally suited for use in preparing class H coils. It is stable to oxidative degradation at temperatures of 250 to 300° C. It also retains its tensile strength at these temperatures. It has a dielectric strength in excess of 500 volts per mil, and retains these properties between 0 and 95 percent relative humidity. It retains its physical properties at operating temperatures of up to 225° C. This retention of properties at elevated temperatures enables Nomex to withstand the physical stresses encountered in electrical equipment at the operating temperatures to which class H coils are subjected.

The tube may be wound of a long flat length of said material and has a pair of annular cylindrical discs of said material received about the tube, one at each end thereof. The discs have a greater radially extending dimension than axially extending dimensions and are bonded to the tube by suitable bonding material and/or by flaring of the ends of the tube outwardly into engagement with the discs.

The full nature of the invention will be understood from the accompanying drawings and the following description and claims.

Figure 1:
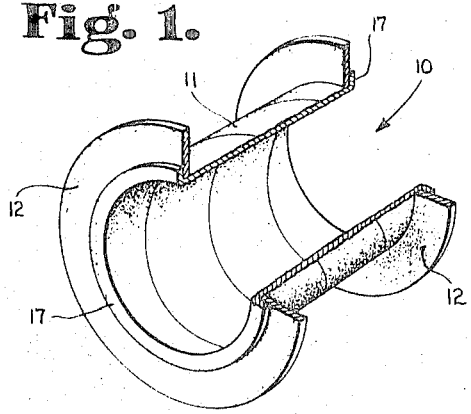
FIG. 1 is a cutaway perspective view of a bobbin constructed according to the present invention.
Figure 3:
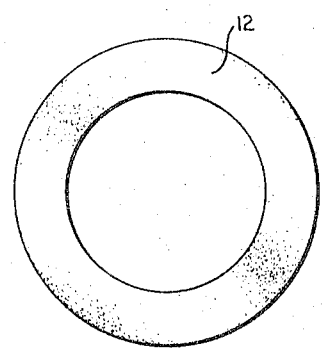
FIG. 3 is an end elevation of an annular member forming a part of the bobbin of FIG. 1.
Figure 2:
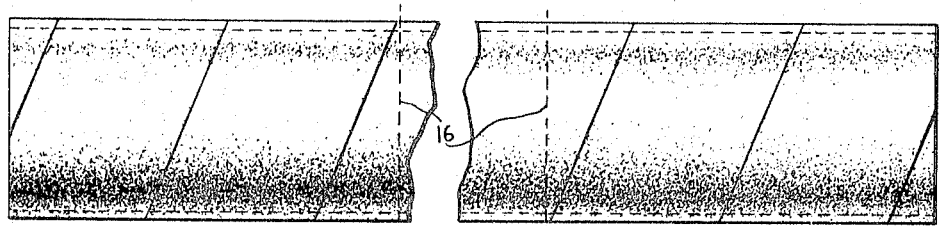
FIG. 2 is a fragmentary side elevation of a length of tubing used in making the bobbin of FIG. 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a bobbin 10 made up of generally cylindrical tubular section 11 and a pair of annular discs 12 secured to the opposite ends of the tube 11. The tubular section 11 and the discs 12 are formed of the aromatic polyamide material.

In order to make the bobbin of FIG. 1, a tube 15 the polyamide can be formed by winding a long flat length of the material having, for example, a thickness of 0.10 inch into the illustrated tube in such a manner that the tube has three thicknesses of the aromatic polyamide bonded together. The bonding together of the material can be accomplished by any suitable bonding agent such as epoxy resin, for example that available from Minnesota Mining and Manufacturing Company under the designation EC1855 and EC1857 or silicone resin bonding agent, for example that available from Dow Corning Corporation of Midland, Mich., under the designation DC271 or by epoxy novalac resin. These materials are all characterized by their ability to withstand high temperatures. All have operating temperatures above 180° C. and are thus suitable adhesives for bonding coils to be used in class H service. Various other bonding agents may also be used such as those known as Prye-ML and/or phenolic resin bonding agent.

The suitable bonding agent is received between layers of the polyamide sheets making up the tube 15. Heat is then applied to bond the layers together resulting in a rigid tube 15. This lamination to form the tube is effected at temperatures of from about 200 to about 500° F., preferably about 250° F.

The tube 15 is cut transversely of the axis thereof and along the plane 16 at equally spaced intervals along the length of the tube to provide a plurality of cylinders of the aromatic polyamide.

Next the annular cylindrical discs 12 are stamped out of a flat sheet of the polyamide by conventional stamping apparatus. These discs are made up of a plurality of sheets laminated together. Best results are obtained when the grain of the laminated sheets are positioned at 90° to each other. This eliminates warpage as the laminate cools. The lamination is conveniently carried out at temperatures of about 540° F. and pressures of about 300 p.s.i. If desirable, a cement may be used to prepare this laminate. Under these conditions satisfactory results are obtained at temperatures of about 300° F. and pressures of about 100 p.s.i. Next, the annular discs 12 are positioned so as to surround the tube 11 and the ends 17 of the tube are flared out as shown in FIG. 1 until they engage the disc 12. A coating of a suitable bonding agent as above described is placed between the disc 12 and the end of the tube prior to the flaring operation so that as a result of the flaring operation, the tubular section 11 is securely bonded to the disc 12.

Figure 4:
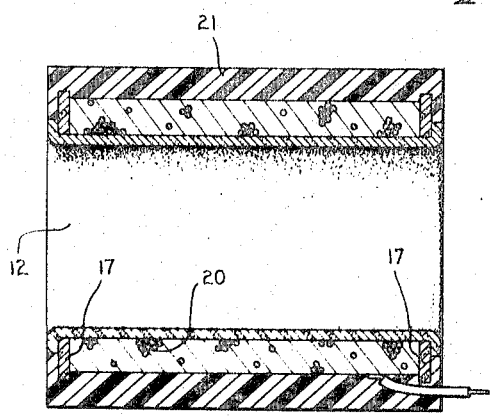
FIGS. 4 and 5 are longitudinal sections of alternative embodiments of encapsulated coils constructed according to the present invention.
Figure 5:
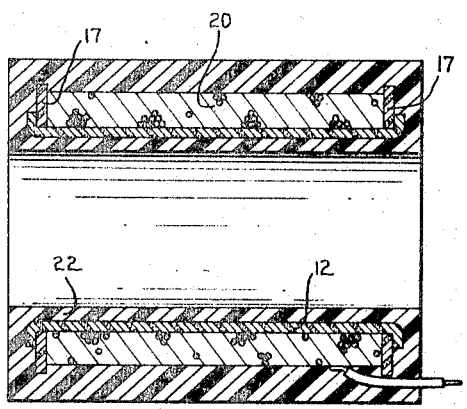

Next, a coil of wire 20 is wound on the bobbin 10 in conventional manner. Lastly, the coil is encapsulated in epoxy resin 21. Such encapsulation can be accomplished similarly to the method disclosed in the U.S. patent to Forrest and Howenstine, 2,856,639, or in any suitable manner by molding or casting or the like. It will be noted that the encapsulated coils of FIGS. 4 and 5 are substantially identical except that the coil of FIG. 5 has an epoxy cylindrical portion 22 at its inside perphery.

Although Nomex is a polyamide it is readily distinguished from the polyamides commonly designated nylons. Nomex is an aromatic polyamide whereas the nylons are straight chain compositions. Nomex is superior to the nylons in electrical applications. Nylon 66, the most stable of these materials, has a maximum service temperature of only 130° C.

Other polyester type materials are inferior to Nomex for the same reason. Thus the polyethylene therephthalate resin sold under the trademark Mylar has a service temperature of 60 to 150° C. and thus would not be useful in class H service.

The polytetrafluoroethylene composition sold under the trademark Teflon are inferior to Nomex as raw materials for preparing an encapsulated coil for use in class H service in that Teflon has a heat distortion temperature of 120° C. In addition Teflon has a tendency to cold flow, and once cold flow has occurred it does not assume its original shape unless heated.

It has been found that the above described invention permits better bonding of the epoxy to the bobbin as compared with a fiberglass bobbin because the polyamide material is not porous. Furthermore, it has been found that when the coil is subjected to rapid changes in temperature, the bobbin and the encapsulation thereabout do not tend to break away from one another. The above described method of manufacture of the bobbin and coil is very easily and conveniently accomplished because of the ease with which the polyamide material is cut and flared and otherwise worked. Nomex is also a relatively inexpensive material to fabricate, thus drastically reducing the cost of the bobbin but without affecting its desirable properties. It has been found that an encapsulated coil constructed as above described fulfills the above described class H requirements in a highly dependable manner.

The use of Nomex in the preparation of class H coils has several advantages over the use of paper in preparing these coils. Paper, such as electrical grade kraft is porous and susceptible to wicking (i.e. the translation of a liquid by the paper acting as a carrier). Nomex, on the other hand, produces a coil with exceptional moisture resistance. This is important because it is obviously impossible to control the relative humidity in all the areas in which these coils are to be used. It is obviously much more difficult, if not impossible, to prepare a moisture resistant coil if one of the coil components is paper and has a tendency to absorb water.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

A process of making encapsulating coils which comprises winding a flat length of a non-porous aromatic polyamide into a multiple layered tubular shape, bonding together layers of said tubular shape by placing epoxy resins between the layers and heating to a temperature of about 200 to 500° F., cutting the shape transversely of the axis at a plurality of points to form a plurality of tubular shapes, positioning a disc made up of a plurality of non-porous aromatic polyamide sheets laminated together in a manner such that the grain of the laminated sheets are positioned at 90° to each other at the ends of each tube, flaring out the ends of said tubular shape into engagement with the discs at the respective ends, bonding the disc to the tube with epoxy resin between the tube and the disc, thereby forming a bobbin, winding a coil wire about said bobbin and encapsulating the wound bobbin.

References Cited

UNITED STATES PATENTS

| | | | |
|---|---|---|---|
| 2,485,745 | 10/1949 | Koonz | 336—192 |
| 2,856,639 | 10/1958 | Forrest et al. | 336—295 |
| 3,037,529 | 6/1962 | Haniik | 174—110.44 X |
| 3,043,994 | 7/1962 | Anderson | 336—96 |
| 3,159,907 | 12/1964 | Bloom | 336—198 |

OTHER REFERENCES

McCure, HT-1 High Temperature Resistant Polyamide Fibers and Paper, E. I. du Pont de Nemours and Co., Mar. 19, 20, 21, 1962. Presented in New York City at the thirty-second annual meeting of Textile Research Institute. P. 9–11.

LARAMIE E. ASKIN, *Primary Examiner.*

T. J. KOZMA, *Assistant Examiner.*